No. 857,335. PATENTED JUNE 18, 1907.
F. EPHRAIM.
VEHICLE WHEEL.
APPLICATION FILED NOV. 21, 1905.
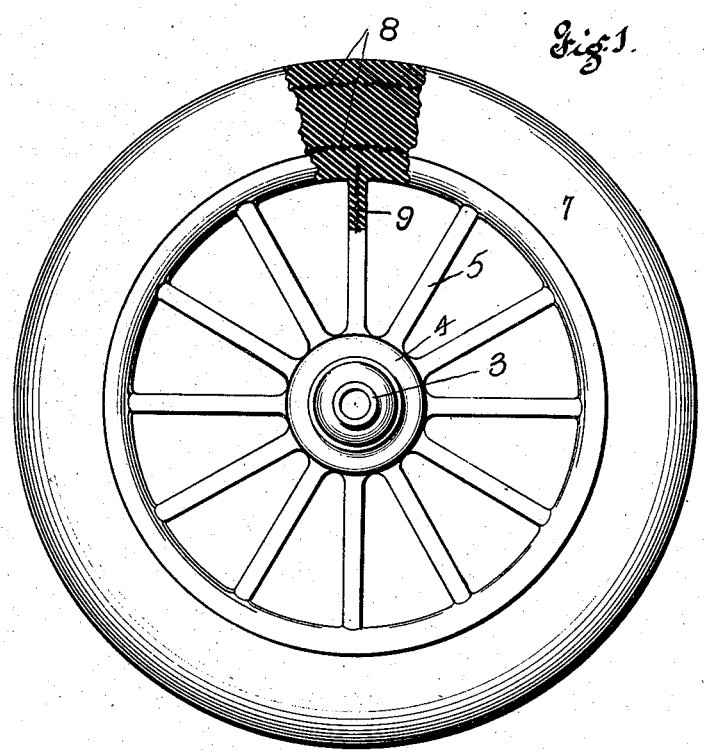
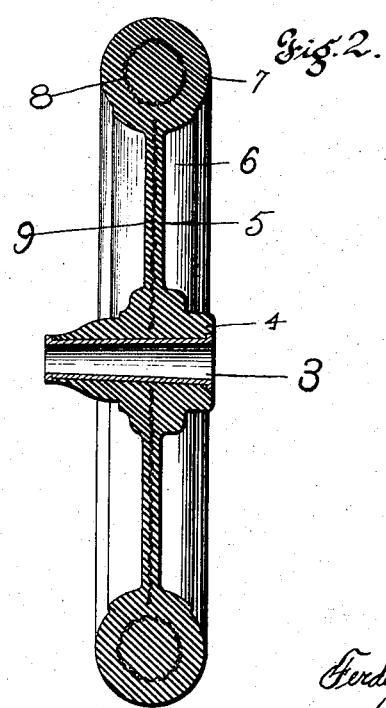

UNITED STATES PATENT OFFICE.

FERDINAND EPHRAIM, OF SAN FRANCISCO, CALIFORNIA.

VEHICLE-WHEEL.

No. 857,335.　　　　Specification of Letters Patent.　　　　Patented June 18, 1907.

Application filed November 21, 1905. Serial No. 288,460.

*To all whom it may concern:*

Be it known that I, FERDINAND EPHRAIM, a citizen of the United States, and a resident of San Francisco, California, have invented certain new and useful Improvements in Vehicle-Wheels, of which the following is a specification.

My invention relates to improvements in vehicle wheels, and has for its object to provide a vehicle wheel, constructed throughout of substantially homogeneous resilient material.

In the drawings—Figure 1 is a plan view of a wheel embodying my invention, having a portion broken away. Fig. 2 is a transverse vertical view in mid-section of the same.

The wheel of my invention as illustrated in the drawings is an integral structure composed of resilient material preferably rubber, or one of its compounds.

In the drawings, I have illustrated my invention embodied in an automobile wheel. I have provided a steel axle box 3 upon which the wheel is molded, the hub 4 being molded in the form shown, encircling the box 3. The spokes 5 project radially on the hub 4 in the usual manner to the felly 6, which is integral with the tire 7. I have thus produced an integral structure capable of performing every function of a vehicle-wheel, and in which I produce the desired degree of rigidity by the mixture of the rubber compound, of which the wheel is constructed. I employ any of the rubber compounds which are well known to the arts, and secure the desired degree of strength and rigidity in the hub and spokes, and of resiliency in the tire by graduating the proportion of rubber used in the compound. Any desired proportion may be used to meet the requirements of the purposes for which the wheel is to be employed. For light automobile uses, I have determined upon forty per cent of rubber in the tire, twenty per cent of rubber in the spokes, and ten per cent of rubber in the hub, but a wide latitude may be allowed in varying these percentages.

In the form of my wheel illustrated in the drawings, I have provided an interstitial web, preferably metallic, in the tires, the web being substantially cylindrical in section, as indicated by the numeral 8; and in the spokes, I have introduced a twisted strand 9 of steel wire. However, this bonding material may be omitted or introduced indifferently, according to the character of wheel desired to be produced, without departing from my invention.

The characteristic feature of my invention is the production of a wheel made of resilient material forming a unitary structure and molded upon a metallic axle-box.

Having thus described my invention, what I claim as new and desire to have secured to me by the grant of Letters Patent, is:

1. An improved vehicle wheel comprising a metallic axle-box, a hub, spokes, felly and tire mounted upon said axle-box and composed of integral resilient material, the resiliency of the wheel being greatest in the tire, and least in the hub, the tire being provided with an interstitial web of strengthening material, substantially as described.

2. An improved vehicle wheel comprising a metallic axle-box, a hub, spokes, felly and tire mounted upon said axle-box and composed of integral resilient material, the resiliency of the wheel being greatest in the tire, and least in the hub, the tire being provided with an interstitial web of strengthening material, and the spokes being provided with metallic stiffening material embedded therein, substantially as described.

In testimony whereof, I have signed my name to this specification, in presence of two subscribing witnesses.

FERDINAND EPHRAIM.

Witnesses:
　M. M. BRAZILL,
　L. A. L. MCINTYRE.